United States Patent [19]

LeLoux

[11] 4,451,308

[45] May 29, 1984

[54] METHOD AND DEVICE FOR MAKING SEALS IN TUBULAR WEB PROVIDED WITH SIDE GUSSETS

[75] Inventor: Arnoldus W. J. LeLoux, Dedemsvaart, Netherlands

[73] Assignee: Wavin B.V., Em Zwolle, Netherlands

[21] Appl. No.: 484,507

[22] Filed: Apr. 13, 1983

[30] Foreign Application Priority Data

Apr. 20, 1982 [NL] Netherlands .......................... 8201641

[51] Int. Cl.³ ............................................... B30B 5/02
[52] U.S. Cl. ...................................... 156/64; 156/350; 156/358; 156/583.1
[58] Field of Search ............ 156/515, 350, 252, 583.1, 156/64, 378, 358; 493/8, 19-20, 22

[56] References Cited

U.S. PATENT DOCUMENTS 3,853,664 12/1974 LaFleur .............................. 156/350

Primary Examiner—David A. Simmons
Attorney, Agent, or Firm—Wigman & Cohen

[57] ABSTRACT

A method of making seals in tubular web provided with side gussets, in which method, after making the seals, sensors for the inner gusset edges are withdrawn outwardly over a certain distance, the position of the sealing devices remaining unchanged, and after transport of the tubular web, the sensors are moved inwardly again and the new position of the inner gusset edges is observed, subsequently, when a difference is observed as compared with the previous time, the position of the sealing devices is brought into correspondence with this observation before making the next seal.

A device for making seals in tubular web provided with side gussets, guide members and gusset sealing devices which are movable independently of one another in lateral direction, and in which individual means are provided to bring the position of the gusset sealing devices in correspondence with the position of the guide members in case the latter, after making a seal and displacing the material one or more unit bag lengths, observe a difference as compared with the previous time.

4 Claims, 3 Drawing Figures

METHOD AND DEVICE FOR MAKING SEALS IN TUBULAR WEB PROVIDED WITH SIDE GUSSETS

BACKGROUND OF THE INVENTION

1. Field of the Invention

The present invention relates to a method of making seals in tubular web provided with side gussets, the location of the inner gusset edges being observed laterally in order to thereby determine the position of the sealing devices for making the gusset seals.

The invention also relates to a device for making seals on tubular web provided with side gussets, the device comprising a pair of side gusset sealing devices, a pair of guide members which are movable transversely for observing the position of the inner gusset edges and determining the position of the gusset sealing devices, and furthermore means for supplying, transporting and discharging the tubular web.

2. Description of the Prior Art

A method and device as mentioned above are disclosed in U.S. Pat. No. 3,835,664. There it is supposed that, in the tubular web to be treated, the spacing between the inner gusset edges is quite regular and that the most important problem to be solved is in a shift of the whole web in lateral direction in the sealing machine. The sealing devices will follow the sensors which, for this reason, are also called guide means; between each sealing device and the associated sensor there is a fixed connection. In practice, however, the spacing between the inner gusset edges is subject to such a variation that this would result in faulty seals in the gussets.

THE OBJECT OF THE INVENTION

The invention aims at providing a rapid method and a quickly operating device, respectively, for following the change in the spacing between the inner gusset edges. By an appropriate design one then automatically obtains an adaptation to possible shifting of the web as a whole laterally in the sealing machine.

SUMMARY OF THE INVENTION

The aim of the invention is reached in the method in that after making the seals, the sensors for the inner gusset edges are withdrawn outwardly over a certain distance, the position of the sealing devices remaining unchanged, in that, after transport of the tubular web, the sensors are moved inwardly again and the new position of the inner gusset edges is observed, and in that subsequently, when a difference is observed as compared with the previous time, the position of the sealing devices is brought into correspondence with this observation before making the next seal.

The device according to the invention with which the method can be implemented, is characterized in that the guide members and the gusset sealing devices are movable independently of one another in lateral direction and in that individual means are provided to bring the position of the gusset sealing devices in correspondence with the position of the guide members in case the latter, after making a seal and displacing the material one or more unit bag lengths, observe a difference as compared with the previous time.

In this way one obtains a very fast and easy adjustment of the location of the gusset sealing members, by making the location of these sealing devices, to begin with, independent of the sensor displacement. Therefore no time need be lost by a slow movement of the heavy sealing devices, but it is sufficient that, after making a seal, the sensors or guide members which are light and can therefore move fast, are displaced outwardly for a moment so as to subsequently move inwardly to observe the new location of the inner gusset edges. Only in case a difference is observed, the heavier sealing devices have to be displaced over the corresponding distance. Such displacement between successive seals will be very small.

Preferably the device is realized such that each sealing device is supported by a support provided with means for displacement relative to the machine frame, and that the guide members are movable relative to said supports.

The invention is applicable for all types of seals which are to be provided in gussets in tubular web material.

The features of the present invention which are believed to be novel are set forth with particularity in the appended claims.

Other claims and many of the attendant advantages will be more readily appreciated as the same becomes better understood by reference to the following detailed description and considered in connection with the accompanying drawings in which like reference symbols designate like parts throughout the figures.

DESCRIPTION OF THE PREFERRED EMBODIMENT

Figure 1:
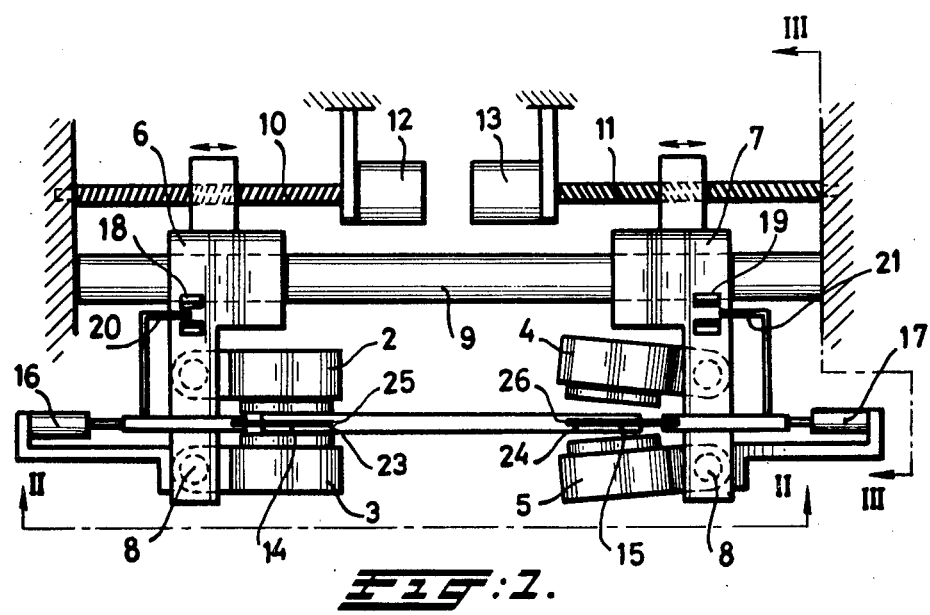
FIG. 1 is a top view of the sealing station, and therefore a horizontal cross sectional view through the frame which carries the sealing station.

The machine disclosed as an example is of the type in which the foil web 1 extends vertically at the moment of making the seals in the side gussets. The web 1 is tubular and has side gussets, as appears particularly from the cross sectional view through the web which is represented in FIG. 1.

At either one of the two sides of the web 1 two sealing members 2, 3 and 4, 5 respectively, are arranged. Each set of sealing members is mounted on a support 6 and 7, respectively, they being pivotable relative to these supports about pins such as 8.

The supports 6, 7 can be displaced individually, parallel to the plane of the web and transverse to the lengthwise direction of this web, along a pair of guide bars 9, 9' (compare also FIG. 3), said bars being affixed to the machine frame. The displacement of these supports 6, 7 along these guides is brought about by means of a pair of screw spindles 10, 11, operating independent of one another and being coupled to motors 12 and 13, respectively.

With each of the supports 6, 7 a guide plate or sensor 14 or 15, respectively, is associated and arranged at a location between the sealing members. This guide plate may at the same time act as a counter pressure plate when making the seals. Each of these plates 14, 15 is movable relative to the associated support to cross the lengthwise direction of the web 1; this movement occurs by means of pneumatic cylinder 16, 17. On each of the supports 6, 7 there is further arranged a photocell means 18, 19; between the light source and the light sensitive element of each of these photocell means there is a small plate 20, 21 rigidly connected with the support plate or sensor 14, 15. The greater or lesser shielding of the light sensitive element enables it to determine the relative position of the support and the guide plate or sensor, in order to utilize this information in a manner which will yet be clarified.

When a fresh web stock has been place into the machine, the screw spindle motors 12, 13 are initiated such that the supports 6, 7 will move toward one another. Thereby the plates 14 and 15 are brought into the side gussets of the tubular web. The motors are stopped when the edges 23, 24 of the blades 14, 15 have arrived at a short spacing from the respective inner gusset edges 25, 26. This situation is represented in the right half of FIG. 1, the sealing members 4, 5 still being pivoted toward their open, non-operative position (At the left in FIG. 1 it is visible that the extreme edge 23 of plate 14 is situated against the innermost gusset edge 25, and that the sealing members 2, 3 are in closed condition, in which they can be operative; in this respect FIG. 1 is a diagrammatic representation of the matter, because in reality these different conditions will never occur at the same time).

When the manual adjustment has proceeded so far, the machine is started and the machine itself will continue to operate by the control circuit (not represented). In the description now to be given by a complete sealing cycle, reference will only be had to the portion of the device at the right in FIGS. 1 and 2, so the side gusset sealing mechanism which is provided on support 7; the operation of the other mechanism is entirely similar and occurs simultaneously.

Figure 3:
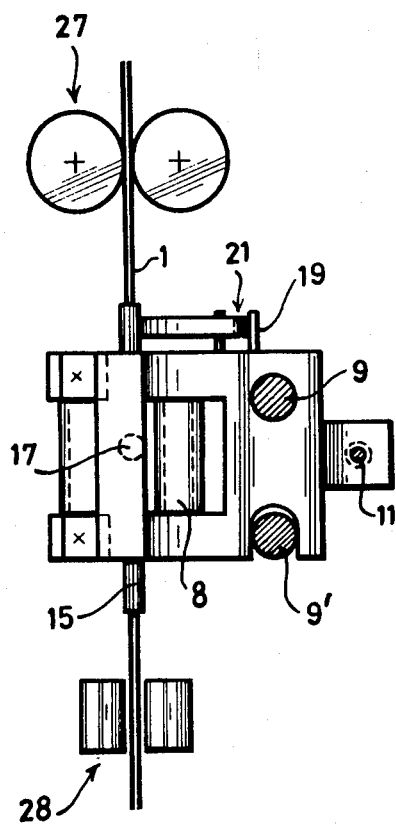
FIG. 3 is a side view according to the arrows III—III in FIG. 1.

Firstly the web is clamped above and below the gusset sealing station., This may be done using transport rollers, such as 27 (see FIG. 3) which will be present anyhow, while past the welding station a set of clamping bars such as 28 may be provided which, from the condition represented in FIG. 3, are urged against the web before the sealing cycle occurs, as will now be described.

Subsequently by means of the pneumatic cylinder 17 the edge 24 of plate 15 is urged against the inner gusset edge 26. By means of the photocell device 19 the mutual position is then determined of support 7 relative to plate 15 in order to subsequently, on the basis of the signal produced by the photocell means, correct this position by means of motor 13 and screw spindle 11. In this manner the two sealing members 4, 5 are brought into the proper position relative to the inner gusset edge 26 for the dimensions of the tubular web in which the gusset seal is to be made, as present at that moment. Subsequently the sealing members 4 and 5 are pressed onto the foil, by means of a mechanism which is known per se and has not been represented, the sensor plate 15 acting as counter pressure plate, and in this way the seals are made in the outermost sheets of foil in the gusset parts.

After making the seals the sealing members 4, 5 will part again. Then, the support with the sealing members remaining immobile, by operation of the pneumatic cylinder 17 the plate 15 is drawn out of the gusset over a small distance; this distance may be 1 to 1,5 cm. Then the clamping device 28 for the tubular web is opened and the web is transported over a distance which is equal to the length of a bag or a multiple thereof. Now the next cycle can start which, after clamping the foil, commences again by moving the center plate inwardly in order to determine the position at that moment of the inner gusset edge 26. As far as this location is exactly the same as the previous time, the support with the sealing members need not be displaced anymore; as far as a small difference is observed, displacement of the support with the sealing members need only take place over the corresponding small distance.

Figure 2:
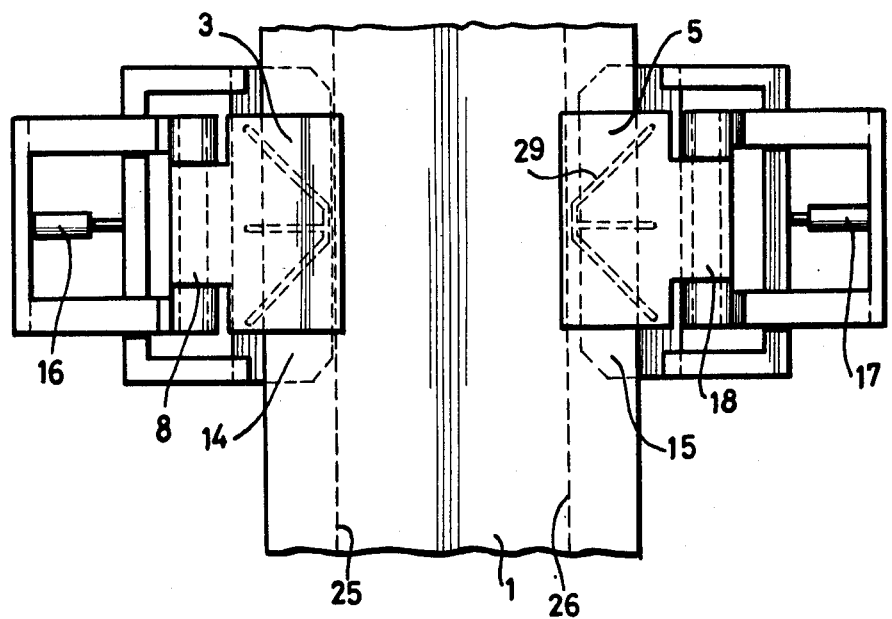
FIG. 2 is an elevation according to the arrows II—II in FIG. 1.

In FIG. 2, indicated by broken lines 29, the pattern is visible of a gusset seal of a certain type which is adapted for a certain embodiment of a bag. The invention, however, is not limited to manufacturing these seal patterns; to the contrary the inventive idea can be applied for manufacturing any desired seal in the side gussets of a tubular web provided with such side gussets.

The advantage of the method and the device according to the invention is, in the first place, that the position of the side gusset sealing members can be adjusted very quickly to the width of the web to be sealed, because during the transport of the web between two sealing cycles only the guide or center plates are displaced outwardly, while the heavy and therefore slow sealing members remain in place. The position of the sealing members requires only little correction or none at all at the beginning of the next sealing cycle, because the position of the inner gusset edges will vary little or not at all over a distance equal to a unit bag length.

Because in practice, namely, over the entire length of the web the location of the inner gusset edges, and also their mutual distance, may vary considerably, the invention is highly advantageous because under all circumstances an accurate adjustment to the real dimensions of the web will be obtained.

Although the present invention has been shown and described in connection with a preferred embodiment thereof, it will be apparent to those skilled in the art that many variations and modifications may be made without departing from the invention in its broader aspects. It is therefore intended to have the appended claims cover all such variations and modifications as fall within the true spirit and scope of the invention.

What is claimed is:

1. A method of making seals in tubular web provided with side gussets, the location of the inner gusser edges being observed laterally in order to thereby determine the position of the sealing devices for making the gusset seals, wherein, after making the seals, the sensors for the inner gusset edges are withdrawn outwardly over a certain distance, the position of the sealing devices remaining unchanged, wherein, after transport of the tubular web, the sensors are moved inwardly again and the new position of the inner gusset edges is observed, and subsequently, when a difference is observed as compared with the previous time, the position of the sealing devices is brought into correspondence with this observation before making the next seal.

2. A device for making seals in tubular web provided with side gussets, comprising a pair of side gusset sealing means, a pair of guide members which are movable transversely for observing the position of the inner gusset edges and determining the position of the gusset sealing means, and furthermore means for supplying, transporting and discharging the tubular web, wherein the guide members and the gusset sealing means are movable independently of one another in lateral direction, individual means being provided to bring the position of the gusset sealing means in correspondence with the position of the guide members in case the latter, after making a seal and displacing the material one or more unit bag lengths, observe a difference as compared with the previous time.

3. A device as claimed in claim 2, wherein each sealing means is supported by a support, provided with means for displacement relative to the machine frame, the guide members being movable relative to said supports.

4. A device as claimed in claim 3, wherein the relative position of the guide members and the supports for the sealing means is determined by means of photocell devices.

* * * * *